Nov. 2, 1954
J. J. MADIGAN
2,693,539
VOLTAGE MODIFIER FOR CIRCUITS
BETWEEN DISCONNECTIBLE BODIES
Filed Feb. 3, 1950
2 Sheets-Sheet 1
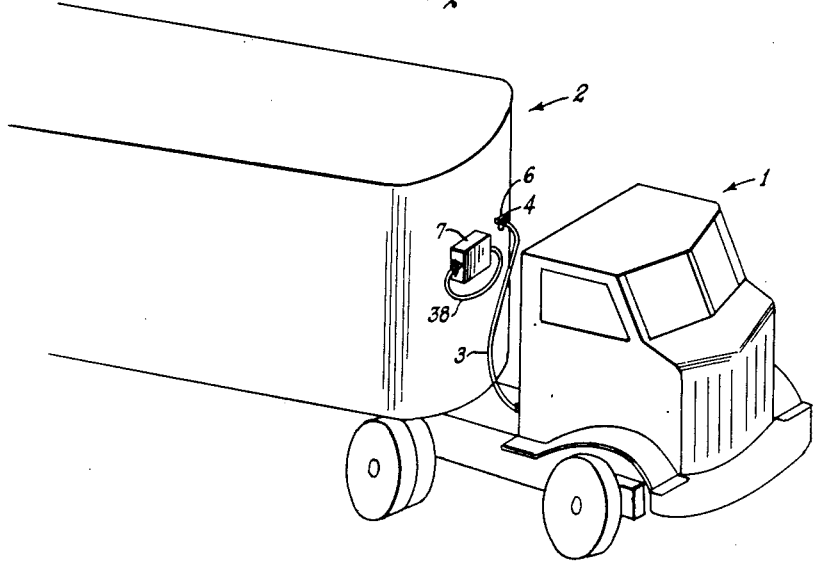
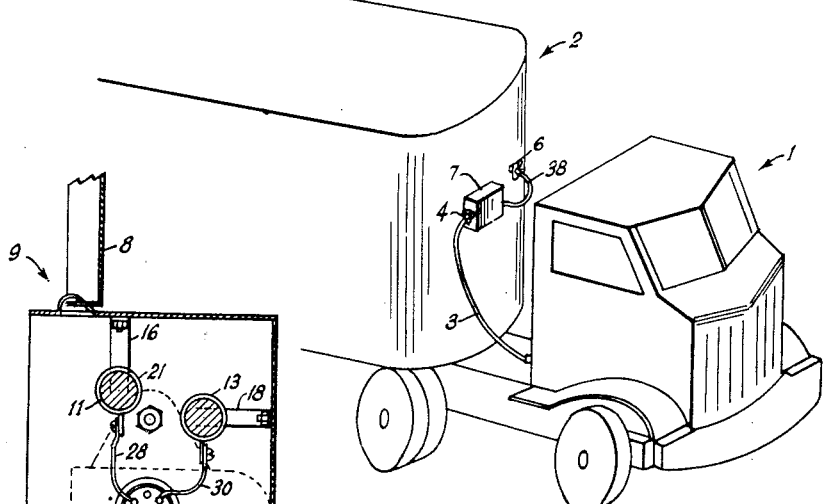
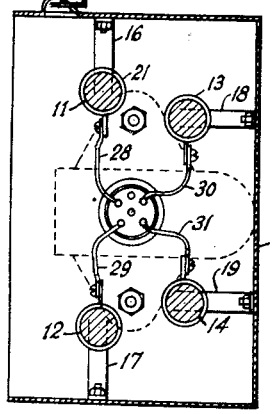
INVENTOR.
JOHN J. MADIGAN
BY
ATTORNEYS Nov. 2, 1954
J. J. MADIGAN
2,693,539
VOLTAGE MODIFIER FOR CIRCUITS
BETWEEN DISCONNECTIBLE BODIES
Filed Feb. 3, 1950
2 Sheets-Sheet 2
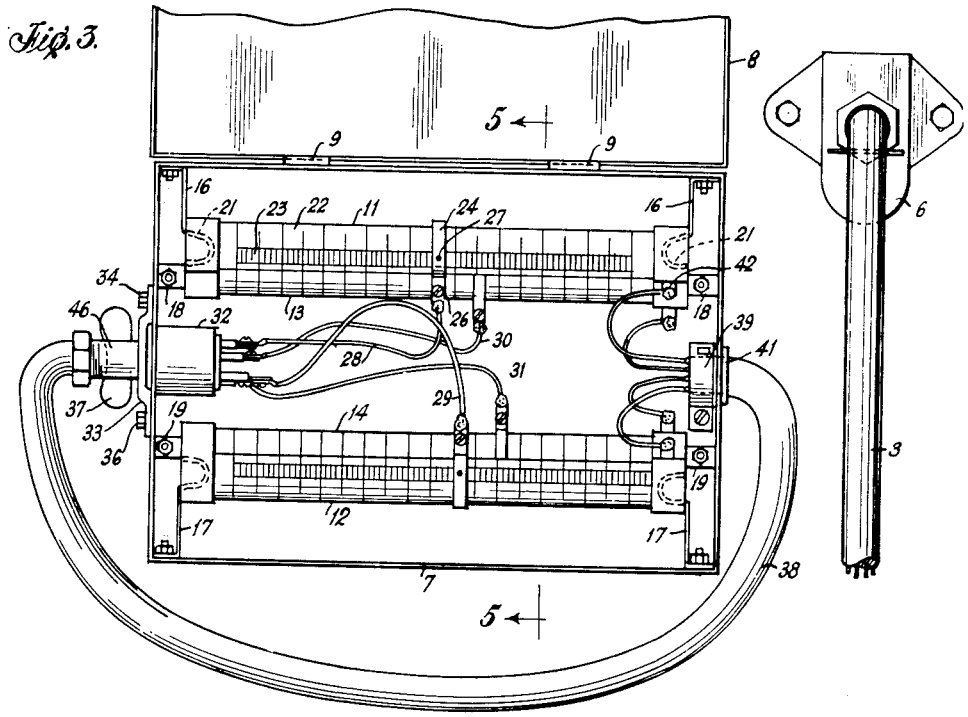
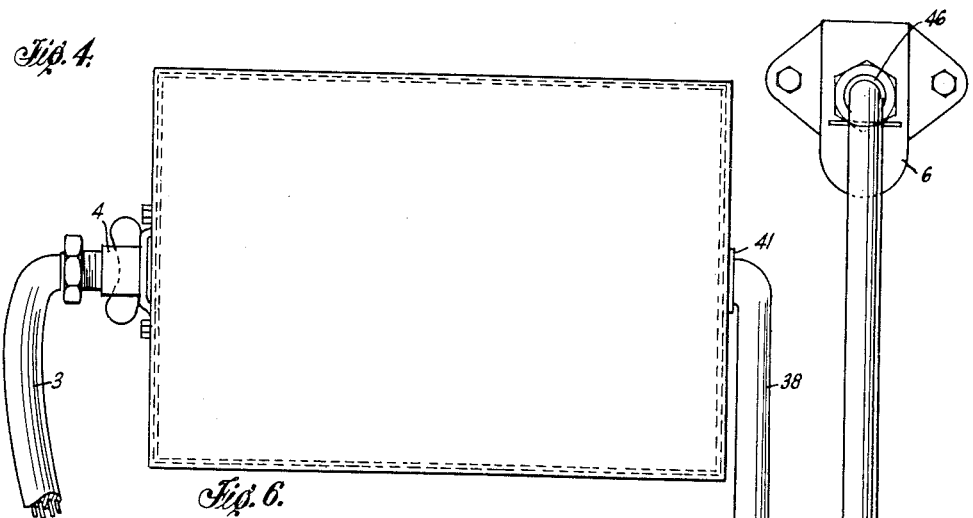
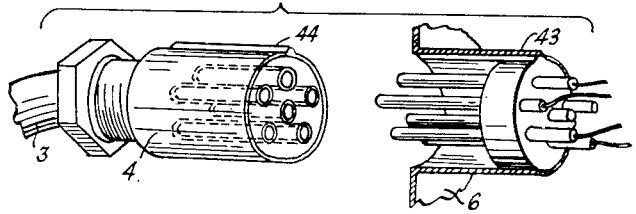
INVENTOR.
JOHN J. MADIGAN
BY
ATTORNEYS

United States Patent Office 2,693,539
Patented Nov. 2, 1954

2,693,539

VOLTAGE MODIFIER FOR CIRCUITS BETWEEN DISCONNECTIBLE BODIES

John J. Madigan, Akron, Ohio

Application February 3, 1950, Serial No. 142,334

10 Claims. (Cl. 307—10)

This invention relates to a voltage regulator and, in particular, to a regulator for use where electric power is transmitted between disconnectible bodies, such as a tractor and trailer, for instance.

In modern tractor-trailer assemblies, the trailer must be equipped with several independent circuits for its various lighting systems, such as the tail lights, stop lights, turn lights, and side lights. These are all powered from the battery in the tractor and the wires leading to the various circuits are enclosed in a cable leading to the power source and to the switches for the various circuits, such switches being located in the cabin of the tractor. The cable terminates in a plug having a contact for each circuit and connection with the various circuits in the trailer is made by connecting the plug to a complementary plug located on the wall of the trailer.

In the conventional system just described, it is necessary that the lamps or other powered equipment in the trailer circuits be suited to the available voltage in the tractor. If, for instance, the circuits of a particular trailer are designed to operate on a 12-volt supply and the tractor which happens to be connected to this trailer has only a 6-volt supply, the trailer lights will be so dim as to be of no practical use. On the other hand, if a trailer has circuits designed for operation on a 6-volt supply and the cable of a tractor having a 12-volt supply is connected thereto, the lamps or other power-consuming devices in the trailer circuit will be burned out. In either case, the only remedy in the past has been, for the most part, to replace the lamps in the trailer circuit with those of proper rating before connecting the cable. This is difficult and time-consuming, especially when it must be done in cold weather. As a matter of practical experience, usually no adjustment is made and burning out of whole sets of lamps has been frequent.

Several solutions of this problem have been proposed. For example, in one scheme, the current from the voltage source to the cable of the tractor is led through a resistor. This has not been satisfactory, especially in the energizing of plural circuits, since the resistor represents a bottleneck and the available power to the various trailer circuits will vary depending upon the number of circuits being energized.

According to the present invention, there is provided an alternative path to the trailer circuits, including a series of resistors adapted to reduce the available voltage, each in an amount appropriate to the circuit to which it leads.

It is, therefore, an object of the invention to provide an alternative, voltage-reducing path for communicating power between disconnectible bodies. More particularly, it is an object to provide a resistor for use between disconnectible bodies which shall be capable of insertion in existing cable lines between such bodies, having plug-in connections. Still other objects are to minimize the burning out of lamps in trailer circuits due to excessive voltage and to avoid the necessity for changing lamps in trailer light circuits to adapt the circuits to available voltage in a tractor.

These and other ends are attained by the present invention, a preferred form of which is described in the following specification and illustrated in the drawings, in which:

Fig. 1 is a view in perspective of a tractor-trailer combination, showing a normal, cable connection from the tractor to the light circuits of the trailer.

Fig. 2 is a view similar to Fig. 1, showing the cable connection as including the resistor unit of the present invention.

Fig. 3 is an enlarged, front view of the resistor box with cover open, showing the cable connection of Fig. 1.

Fig. 4 is a view similar to Fig. 3, with the cover closed, showing the cable connection of Fig. 2.

Fig. 5 is a sectional view taken on the line 5—5 of Fig. 3.

Fig. 6 is an exploded view in perspective of a mating pair of plugs, representing the direct connection from tractor to trailer.

Referring to the drawings by characters of reference, there is shown generally at 1, in Figs. 1 and 2, a tractor body and generally at 2 a trailer body, each of which may be of conventional construction. The tractor, which carries the engine, also has the storage battery (not shown), which is employed to power the light circuits on the trailer. Such power is communicated, in conventional systems, through a cable 3 having a female plug 4 engageable with a male plug carried by an escutcheon 6, fastened to the trailer, as shown in Fig. 1. In this figure, the resistor box 7 of the present invention is not in use and the connection shown represents the case where the lamps in the trailer light circuit are suited to the voltage available from the tractor, through cable 3.

The resistor box, shown in detail in Fig. 3, is rectangular in form and has a closure lid 8, hinged thereto as at 9. Standard, tubular, resistor elements 11, 12, 13, 14 are supported, in spaced relation to the interior walls of the box by brackets 16, 17, 18, 19, bolted to the box, the ends of the brackets being bent into hook form, as indicated at 21, and engaged in the open ends of the tubular, resistor elements. Each of the latter, as shown in the case of resistor 11, has an outer insulating coating 22, which is removed along a longitudinal path to expose resistance wires 23 for tapping purposes.

Tapping at any desired location is accomplished through a rider comprising a strap 24, encircling the resistor and securable in position by a screw 26. Preferably, strap 24 will have an indentation 27 so as to ensure good electrical contact with reference wires 23.

Conductors 28, 29, 30, 31 are soldered to the respective riders of resistors 11–14, and are screw fastened at their other ends to the respective terminals of a male plug 32, carried on an escutcheon 33 secured to one end of box 7 as by bolts 34, 36, and extending into the interior of the box. Escutcheon 33 is of conventional form and has a spring-urged plate to cover the exposed ends of plug 32, the plate being movable to open position by an eared, outwardly bent extension 37. Escutcheon 6 may be of similar construction.

At the other end of the box, one end of a short length of cable 38 passes through an opening in the box and is secured by an inner clamp 39 on which is threaded, exteriorly of the box, a nut 41. The end of cable 38 within the box is bared to expose its several wires which are soldered to the end terminals 42 of the respective resistors.

Male plug 32 is similar to the male plug 43 (Fig. 6) carried by the escutcheon 6 secured to the trailer 2 and cable 38 carries a female plug 46 at its end which is connectible either with the plug 43 in the trailer or the plug 32 in the box 7. The female plug 4 of cable 3 is identical with plug 46 and is therefore also insertable in either the plug on the trailer or the plug on the box. A rib 44 on plug 4 and a similar rib on plug 46 ensure joining of the proper plug contacts.

When the lights in the trailer are adapted to the voltage available in the tractor, plug 4 on cable 3 is connected to plug 43 on the trailer in the conventional manner. In this case, plug 46 of cable 38 is connected to plug 32 of box 7 for storage, and the resistor box is not in use. This is shown in Figs. 1 and 3.

However, if the voltage in the tractor is higher than the voltage rating of the trailer lamps, plug 46 of cable 38 is connected to plug 43 on the trailer and plug 4 of cable 3 is connected to plug 32 of box 7, so that current to the various trailer circuits passes through the several resistors and the voltage is appropriately lowered. This is the case shown in Figs. 2 and 4.

Since the voltage demands of the various trailer circuits will not, in general, be the same, appropriate modification is made by adjustment of rider 24 for each case. Once made, such adjustment will seldom need to be changed.

It will be seen that there has thus been provided a conversion device whereby the light circuits of a trailer may be readily adapted to available voltage in a tractor, when necessary, with no more added effort than the making of one additional plug connection. The utility and economy of the device become quite evident when compared with prior practice wherein each individual lamp had to be opened, each bulb removed, and a replacement made therefor.

An inherent and additional advantage of the resistor unit shown lies in the fact that the same structure which makes possible the insertion of the unit so as to be, in effect, a part of the conventional connecting cable, also provides a neat and secure means for stowing the auxiliary cable of the resistor unit when the latter is not employed in the tractor-trailer connection.

In addition to the foregoing, it should be noted that the device may be easily constructed from standard, available parts.

While a certain preferred embodiment of the invention has been shown and described, changes may be made in the size, shape, and arrangement of the various parts, for instance, without, however, departing from the spirit or scope of the appended claims.

What is claimed is:

1. A voltage-modifying device comprising a support element, a resistor in said element, a conductor leading exteriorly of said element, and in electrical contact with a portion of said resistor, a connector plug on said conductor, exteriorly of said element, and a connector plug on said element, in electrical contact with another portion of said resistor, said plugs being of complementary construction whereby the plug on the said conductor is engageable with the plug on the said element, the arrangement being such that when said plugs are in engagement said resistor is in a closed circuit.

2. A voltage-modifying device comprising a support element, a plurality of resistors in said element, a cable leading exteriorly of said element, and having conductors, each in electrical contact with a portion of one of said resistors, a connector plug on said cable bearing exposed termini of said conductors, a connector plug on said element and having exposed contact elements, and electric leads from respective ones of said contact elements to respective ones of said resistors, said plugs being complementary one to the other so as to be engageable, one with the other, and said conductors and electric leads being so arranged that each resistor is in a closed circuit when said plugs are in mutual engagement.

3. In combination, a vehicle adapted to be towed, electrical circuits in the said vehicle, a connector plug on said vehicle having contacts connected, respectively, to the leads to said circuits, a series of resistors attached to said vehicle, a cable having conductors attached to the respective said resistors and having a plug complementary to the first-mentioned plug for engagement therewith, and a plug having leads connected to the respective said resistors and adapted to receive the plug attached to the said cable so as to place said resistors in a closed circuit with said conductors.

4. In combination, a vehicle, electrical circuits in said vehicle, a connector plug on said vehicle, having contacts connected respectively to the leads to said circuits, a series of resistors carried on said vehicle, a cable having conductors attached to the respective said resistors, and having a plug complementary to the first-mentioned plug for engagement therewith, and a plug having leads connected to the respective said resistors, said latter plug being complementary to the plug on the cable so as to be engageable therewith to place the respective resistors in closed circuit with the respective said conductors.

5. In combination, a vehicle, electrical circuits in said vehicle, a connector plug on said vehicle having contacts connected, respectively, to the leads to said circuits, a series of resistors carried on said vehicle, a cable having conductors attached to the respective said resistors, and having a plug complementary to the first mentioned plug whereby said resistors are connectible to the said circuits in a single, predetermined relation of each resistor to a particular one of said circuits, and a second plug on the vehicle, similar to the first-mentioned plug and having contacts each connected to the same resistor as the contact on the cable plug engageable with the corresponding contact in the first-mentioned plug, so as to place said resistors in a closed circuit when said cable plug and said second plug are in contact.

6. In combination, a vehicle having electrical circuits, a plurality of resistors on said vehicle, a pair of identical plugs on said vehicle, one of said plugs having contacts connected with the respective said circuits and the other of said plugs having contacts connected respectively with said resistors, a cable having conductors connected respectively to said resistors, and said cable having a plug complementary to each of said pair of plugs, the contacts of the said other of said plugs being in series with corresponding contacts on the cable plug, through the said resistors, whereby the latter are placed in a closed circuit when said cable plug is in engagement with said other of said plugs.

7. In a tractor-trailer vehicle combination, a cable on the tractor having conductors connected to a source of electromotive force in the tractor, a connector plug on the trailer having contacts adapted for engagement with complementary contacts on a plug on said cable, a series of resistors on the trailer, a second cable having conductors connected respectively to said resistors and having a plug also complementary to the said plug on the trailer, so that said cables are alternatively connectible therewith, and a second plug on the trailer complementary to the plug on either of said cables, and said second plug having leads so connected to the said resistors that the latter are, respectively, in closed circuit with the conductors in the said second cable when the plug on the latter cable is engaged with the said second plug on the trailer.

8. In a combination of disconnectible vehicles, a source of electromotive force in one of said vehicles, a plurality of conductors leading from said source, a plurality of electrical circuits in the other of said vehicles, a plurality of voltage-modifying elements on the said other of said vehicles, a plurality of conductors connected respectively to said elements, the first-mentioned and second-mentioned plurality of conductors being each alternatively connectible as a unit to the said circuits or to the input end of said elements, the latter being placed in a closed circuit with said second mentioned plurality of conductors when the latter are connected to said input end of said elements.

9. In combination, a vehicle, electrical circuits in said vehicle, a first plug on said vehicle having contacts connected respectively to the leads of said circuits, a series of resistors carried on said vehicle, conductors attached to the respective resistors and to the contacts of a second plug complementary to the first plug, means on the said plugs defining a single mode of connection thereof, wherein each said resistor is connectible with a predetermined one, only, of said circuits, a third plug complementary to the said second plug, means defining a single mode of connection between the said second and third plugs, and leads from the contacts of the said third plug to the respective resistors, and so arranged that when the said second and third plugs are connected the respective said conductors are in closed circuit with the resistors to which they are attached.

10. In a tractor-trailer combination having a power source in the tractor, a cable connected thereto, light circuits in the trailer including a plural plug connector and a plural plug connector on the said cable complementary to the trailer plug connector, and means on the plug connectors defining a single mode of connection thereof, the improvement comprising a voltage-modifying unit having a plurality of resistors, a cable having conductors connected to the respective resistors, a plug on the cable of said unit identical with the plug on the tractor cable, and a plug having leads also connected to said resistors, and said latter plug identical with the said trailer plug connector.

References Cited in the file of this patent

UNITED STATES PATENTS

| Number | Name | Date |
|---|---|---|
| 1,204,675 | Lyon | Nov. 14, 1916 |
| 2,015,209 | Whiteside | Sept. 24, 1935 |
| 2,193,893 | Van Vleck | Mar. 19, 1940 |